H. C. LITTLE.
EXPANSIBLE WHEEL.
APPLICATION FILED MAR. 25, 1912.
1,110,804.
Patented Sept. 15, 1914.
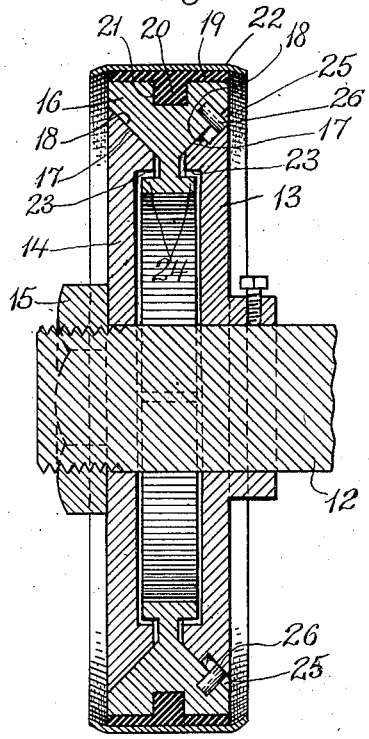
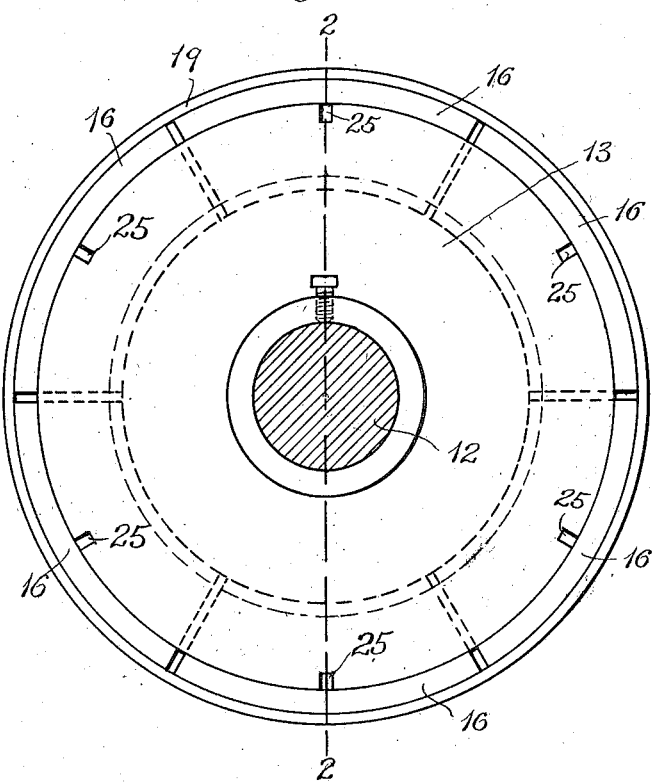
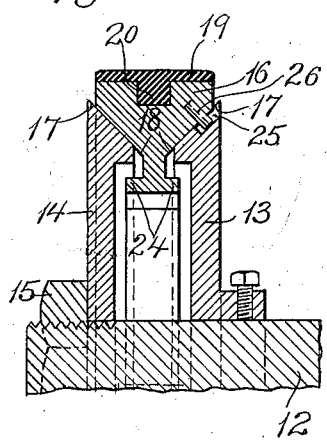
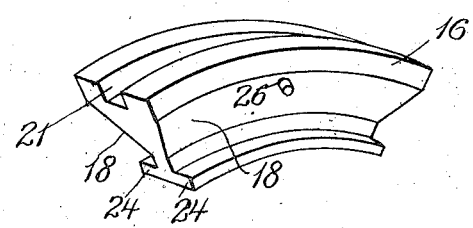
Witnesses:
G. L. Johnson
E. N. Batchelder
Inventor:
H. C. Little
by Mason Brown Quimby May
Attys.

UNITED STATES PATENT OFFICE.

HENRY C. LITTLE, OF NEWTON, MASSACHUSETTS.

EXPANSIBLE WHEEL.

1,110,804. Specification of Letters Patent. Patented Sept. 15, 1914.

Application filed March 25, 1912. Serial No. 686,211.

*To all whom it may concern:*

Be it known that I, HENRY C. LITTLE, a citizen of the United States, and a resident of Newton, in the county of Middlesex and State of Massachusetts, have invented certain new and useful Improvements in Expansible Wheels, of which the following is a specification.

This invention relates generally to expansible wheels or pulleys and particularly to a rotary buffing wheel comprising a hub or body portion attached to a rotary shaft, an annular yielding pad or tire surrounding the body portion and an abrasive annular pad cover surrounding the pad and yieldingly backed thereby, the pad cover being made of any suitable material adapted to abrade or otherwise act on leather or other material presented to the wheel.

The invention has for its object to provide an expansible wheel of simple construction adapted to permit the quick and convenient application and removal of an annular cover or of a belt.

The invention consists in the improvements which I will now proceed to describe and claim.

Of the accompanying drawings:—Figure 1 represents a side elevation of an expansible wheel embodying my invention. Fig. 2 represents a section on line 2—2 of Fig. 1. Fig. 3 represents a view similar to a portion of Fig. 2, showing the rim of the wheel and the pad thereon contracted. Fig. 4 represents a perspective view of one of the rim members.

The same reference characters indicate the same or similar parts in all the figures.

A buffing wheel embodying my invention is constructed as follows: In the drawings: 12 represents a rotary shaft which may be journaled in bearings in a supporting frame not shown. With the shaft is engaged the hub or body portion of the wheel, said hub being composed of two circular members 13 and 14. The member 13 is preferably secured rigidly to the shaft by any suitable means, and the member 14 is movable laterally toward and from the member 13. The shaft is provided with means for adjusting the member 14 and confining it at any desired distance from the member 13, the means here shown being a nut 15 engaged with the screw-threaded portion of the shaft 12 and bearing on the outer side of the hub member 14.

The rim of the wheel which supports the pad hereinafter described is composed of a series of segmental sections 16 which collectively constitute an expansible and contractible annular rim, the sections being movable radially outward from the shaft to expand the rim and inward toward the shaft to contract the rim.

The hub and rim members are provided with complemental means whereby a lateral movement of one of the hub members toward the other causes an outward radial movement of the rim members 16 and an expansion of the rim. Said means, as here shown, include beveled marginal inner faces 17 on the hub members 13 and 14, and beveled side faces 18 on the rim members 16, said faces being preferably formed and arranged as shown by Figs. 2 and 3, the faces of the rim members being in sliding contact with the faces of the hub members. When the hub member 14 is moved laterally toward the member 13 the distance between the beveled faces 17 is decreased and said faces act to force the rim members 16 outwardly.

The segmental outer faces of the rim members 16 collectively constitute a seat for an annular elastic pad 19 which is preferably composed of elastic rubber and is preferably provided with a rib 20 on its inner side fitting grooves 21 in the rim members 16. The normal diameter of the pad 19 is such that when the hub members are separated, as indicated by Fig. 3, the pad in contracting from its expanded operative position, shown by Fig. 2, also contracts the rim, the rim members 16 being moved radially inward by the contraction of the pad. When the hub member 14 is adjusted inwardly, as shown by Fig. 2, to expand the rim, the pad is also expanded and is caused to bear closely on the interior of an abrasive pad cover 22 which may be an endless band of cloth, sand paper or other material. The diameter of the band is greater than the normal diameter of the pad 19 when the latter is contracted, and is less than that of the pad when the pad is expanded to the fullest extent permitted by the construction above described. It follows, therefore, that the pad cover may be readily placed in a loose condition on the contracted pad and is firmly secured in its operative condition by the expansion of the rim and pad. When the expanding pressure on the rim is removed, the rim is automatically contracted by and with the pad, the cover being thus released so that it may be readily removed.

The hub members 13 and 14 are provided with inwardly projecting stop shoulders 23, and the rim members 16 are provided with complemental outwardly projecting stop shoulders 24 adapted to abut against the shoulders 23 and limit the outward radial movement of the rim members, so that the detachment of the rim members from the hub is prevented.

The rigid hub member 17 is provided with a series of clutch members 25 here shown as slots formed in the inclined face 17, and each rim member is provided with a complemental clutch here shown as a pin or stud 26 projecting into and adapted to slide in a slot 25. These clutch parts insure the rotation of the rim with the hub, and hold the rim members uniformly spaced apart.

The cover 22 is preferably wider than the pad 19, so that its edges project outwardly from the edges of the pad and are adapted to be bent inwardly over the edges of the pad by pressure of the work against it. The edge portions of the pad and cover are therefore adapted to act on narrow grooved or recessed surfaces. Moreover, the edges of the cover are not stretched like the central portion, and they therefore form inclined flanges which prevent lateral displacement of the cover. The hub members 13 and 14 engaged with the shaft, constitute means for supporting and rotating the expansible rim, and the inclined faces and the devices shown for adjusting the member 14 constitute means for positively expanding the rim and for releasing the same from expanding pressure to permit the automatic contraction of the pad and the contraction of the rim by the pad.

I do not limit myself, however, to the particular form of means for supporting and rotating the rim, and for applying and removing the expanding pressure, here shown. The described wheel without the pad cover 22, may be used as an expansion pulley cooperating with a belt running on the elastic pad 19, which for this purpose may be called an elastic tire or face.

I claim—

1. A wheel of the character stated comprising a shaft, a hub composed of two opposed circular members one rigidly attached to the shaft and the other adjustable laterally on the shaft, means for confining the adjustable member in its adjusted positions, the peripheries of said hub members being beveled, the bevels of said peripheries being oppositely disposed, an annular rim composed of a series of independent segmental members provided with beveled sides complemental to said beveled peripheries, and a continuous contractile elastic tire having a cover of abrasive material embracing said rim, said hub and segmental members being provided with complemental means located between the beveled portions and the shaft for limiting outward movement of said segmental members.

2. A wheel of the character stated comprising a shaft, a hub composed of two opposed circular members one rigidly attached to the shaft and the other adjustable laterally on the shaft, means for confining the adjustable member in its adjusted positions, an annular rim composed of a series of independent segmental members located between said hub members, said segmental members and said hub members being provided with complemental means for effecting radial adjustment of said segmental members, and a continuous contractile tire having a cover of abrasive material surrounding said rim, said hub and said segmental sections being provided with means for limiting outward movement of said segmental sections, said limiting means being located between said shaft and said radial adjusting means.

3. A wheel of the character stated comprising a shaft, a hub composed of two opposed circular members one rigidly attached to the shaft and the other adjustable laterally on the shaft, means for confining the adjustable member in its adjusted positions, an annular rim composed of a series of independent segmental members located between said hub members, said segmental members and said hub members being provided with complemental means for effecting radial adjustment of said segmental members, a continuous contractile tire having a cover of abrasive material surrounding said rim, said hub and said segmental sections being provided with means for limiting outward movement of said segmental sections, said limiting means being located between said shaft and said radial adjusting means, said tire and segmental sections being provided with complemental means for preventing relative lateral movement.

4. A wheel of the character stated comprising an annular rim, an annular elastic tire thereon constituting a pad, means for expanding the rim and permitting its contraction by the pad, and a pad cover embracing the pad, the cover being of greater width than the pad so that its edges are caused to contract by the expansion of the pad to form inclined flexible flanges projecting from opposite edges of the pad and preventing edgewise displacement of the cover in either direction.

In testimony whereof I have affixed my signature, in presence of two witnesses.

HENRY C. LITTLE.

Witnesses:
C. F. BROWN,
P. W. PEZZETTI.